(12) United States Patent
Shimoda et al.

(10) Patent No.: US 11,039,112 B2
(45) Date of Patent: Jun. 15, 2021

(54) HEAD UP DISPLAY APPARATUS

(71) Applicant: Maxell, Ltd., Kyoto (JP)

(72) Inventors: Nozomu Shimoda, Kyoto (JP);
Kazuyuki Takizawa, Kyoto (JP)

(73) Assignee: MAXELL, LTD., Kyoto (JP)

( * ) Notice: Subject to any disclaimer, the term of this patent is extended or adjusted under 35 U.S.C. 154(b) by 0 days.

(21) Appl. No.: 16/635,590

(22) PCT Filed: May 25, 2018

(86) PCT No.: PCT/JP2018/020214
§ 371 (c)(1),
(2) Date: Jan. 31, 2020

(87) PCT Pub. No.: WO2019/058645
PCT Pub. Date: Mar. 28, 2019

(65) Prior Publication Data
US 2020/0221057 A1    Jul. 9, 2020

(30) Foreign Application Priority Data

Sep. 21, 2017    (JP) .............................. JP2017-181487

(51) Int. Cl.
*H04N 9/31*           (2006.01)
*G02B 27/01*          (2006.01)
*B60K 35/00*          (2006.01)

(52) U.S. Cl.
CPC ........... *H04N 9/3179* (2013.01); *B60K 35/00* (2013.01); *G02B 27/0101* (2013.01);
(Continued)

(58) Field of Classification Search
CPC ............ H04N 9/3179; G02B 2027/014; G02B 2027/0141; B60K 35/00; B60K 2370/1529; B60K 2370/166
See application file for complete search history.

(56) References Cited

U.S. PATENT DOCUMENTS

2017/0332059 A1* 11/2017 Tabata ................. H04N 9/3164
2017/0355265 A1   12/2017 Fujita
(Continued)

FOREIGN PATENT DOCUMENTS

JP        2010-064633 A    3/2010
JP        2015-031700 A    2/2015
(Continued)

*Primary Examiner* — Tsion B Owens
(74) *Attorney, Agent, or Firm* — Volpe Koenig

(57) ABSTRACT

Poor visibility due to abnormal display caused by occurrence of failure of HUD is reduced using AR-HUD which includes a vehicle information acquiring unit, a controller, and a video display apparatus. The vehicle information acquiring unit acquires various types of vehicle information that can be detected by a vehicle. The controller controls display of a video in a display region visually recognized through a windshield from a driver's seat of a vehicle based on vehicle information acquired by the vehicle information acquiring unit. The video display apparatus generates video based on an instruction from the controller. The controller acquires apparatus information which is used when determining apparatus fault, determines whether the apparatus fault is present or not based on the acquired apparatus information, and performs a display content changing process to change content of the video projected onto the windshield when determined that the apparatus fault is present.

7 Claims, 13 Drawing Sheets

(52) U.S. Cl.
CPC ............. *B60K 2370/1529* (2019.05); *B60K 2370/166* (2019.05); *B60K 2370/167* (2019.05); *B60K 2370/176* (2019.05); *B60K 2370/52* (2019.05); *G02B 2027/014* (2013.01); *G02B 2027/0141* (2013.01)

(56) References Cited

U.S. PATENT DOCUMENTS

2018/0157036 A1* 6/2018 Choi ................... G06T 19/006
2018/0203226 A1* 7/2018 Tomioka ............. G06F 3/1423

FOREIGN PATENT DOCUMENTS

| JP | 2015-104051 A | 6/2015 |
| JP | 2017-035980 A | 2/2017 |
| WO | 2016/143412 A1 | 9/2016 |

* cited by examiner

| PARAMETER | STATE | NORMAL RANGE | THRESHOLD VALUE | CURRENT VALUE |
|---|---|---|---|---|
| TEMPERATURE A OF VIDEO DISPLAY APPARATUS | READABLE | 0~○°C | 80°C | 60°C |
| TEMPERATURE SENSOR B OF CPU | READABLE | 0~○°C | 70°C | 72°C |
| LUMINOUS INTENSITY C | READABLE | 0~○cd | 14000cd | 10000cd |
| MIRROR ANGLE A | READABLE | 0~○ | — | 30 |

| COMMUNICATION PARTNER | PRESCRIBED COMMUNICATION INTERVAL[sec] | FAILURE DETERMINATION THRESHOLD VALUE (X [Sec] HAS ELAPSED FROM PREVIOUS COMMUNICATION) |
|---|---|---|
| UNIT A | 30 | 90 |
| UNIT B | 60 | 180 |
| UNIT C | 45 | 135 |

| DESTINATION | UPPER LIMIT OF CONSECUTIVE ERROR COUNT | CURRENT CONSECUTIVE ERROR COUNT |
|---|---|---|
| UNIT A | 30 | 0 |
| UNIT B | 30 | 8 |
| UNIT C | 30 | 1 |

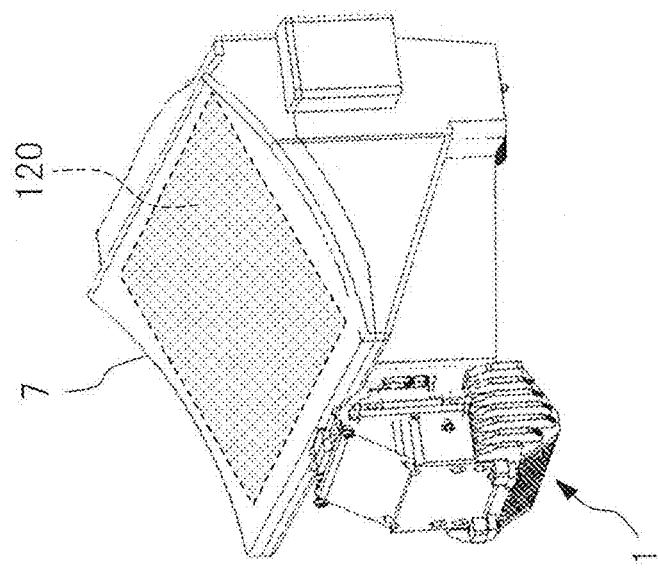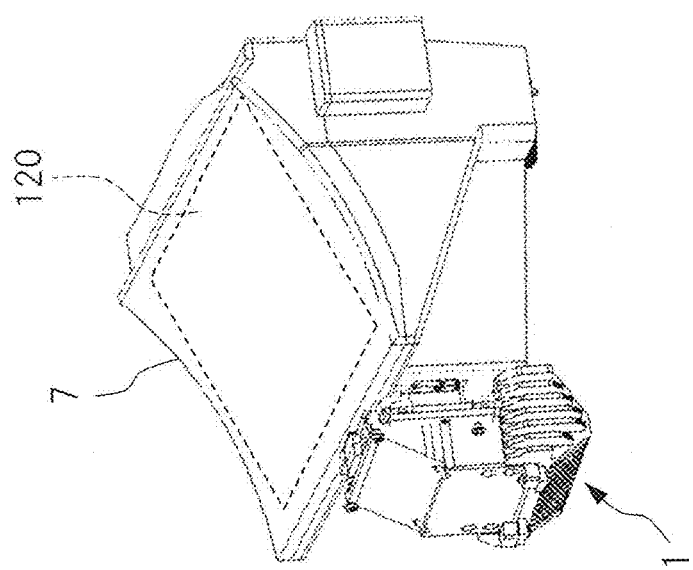

HEAD UP DISPLAY APPARATUS

TECHNICAL FIELD

The present invention relates to a technology for a head up display apparatus, and particularly relates to a technology effectively applied to a head up display apparatus using augmented reality (AR).

BACKGROUND ART

It is known that a head up display (hereinafter, referred to as "HUD" in some cases) that projects and displays information on a windshield or the like is used in a vehicle such as an automobile.

This HUD is configured to project driving information such as vehicle speed and engine speed or information of a car navigation or the like onto the windshield as described above. A driver can check the information without moving a line of sight to an instrument panel incorporated in a dashboard, and can reduce the amount of movement of the line of sight.

As described above, the HUD contributes to the safe driving of the driver, but there is not much consideration given to the occurrence of the display defect of the HUD. As a result, for example, even when the defect occurs in the display of the HUD, the driver is unable to do anything, and an abnormal display continues until repair is complete.

Note that, as to the system to display this kind of vehicle information, for example, a technology of alternatively displaying the information necessary for the driving at the time of the malfunction of the display apparatus or the control apparatus is known (see, for example, Patent Document 1).

RELATED ART DOCUMENTS

Patent Documents

Patent Document 1: Japanese Patent Application Laid-open Publication No. 2017-35980

SUMMARY OF THE INVENTION

Problems to be Solved by the Invention

The case where a defect occurs in, for example, the control circuit of the display system of the HUD while a vehicle is moving will be considered. There are various patterns in the display fault of the HUD due to the occurrence of the defect in the control circuit of the display system. In the case where the display of the HUD simply disappears, it does not hinder the safe driving.

Meanwhile, the display that hinders the safe driving of the driver is made in some cases. As the examples of such display fault, the display brightness of the HUD is increased, the information displayed on the HUD is not updated, or a large amount of unnecessary information is displayed.

When the display fault described above occurs in the HUD, the attention of the driver may be paid to the display of the HUD or the poor visibility may be caused. As a result, there is a fear of overlooking cars, people, signs, obstacles, and the like to which attention should be paid while driving, or being late to notice them.

In recent years, a display region of the HUD tends to be wide from the viewpoint of driving support, and there is a fear that the poor visibility of the driver causes a more severe problem when the display fault described above occurs in the HUD having the large display region.

An object of the present invention is to provide a technology capable of reducing the poor visibility due to the abnormal display caused by the occurrence of failure in the HUD.

The above and other object and the novel feature of the present invention will be apparent from the description of the specification and the accompanying drawings.

Means for Solving the Problems

An outline of the typical invention disclosed in this application will be briefly described below.

Namely, the typical head up display apparatus displays a video in a display region visually recognized through a windshield from a driver's seat of a vehicle.

This head up display apparatus includes: a vehicle information acquiring unit; a controller; and a video display apparatus. The vehicle information acquiring unit acquires vehicle information detected by a vehicle. The controller controls the display of the video. The video display apparatus generates the video.

Also, the controller acquires apparatus information which is the information used when determining apparatus fault, determines whether the apparatus fault is present or not based on the acquired apparatus information, and performs a display content changing process to change the display content of the video when determined that the apparatus fault is present.

In particular, the controller cuts off the power supplied to the head up display apparatus as the display content changing process. Alternatively, the controller turns off the light source with which the video display apparatus projects the video as the display content changing process.

Effects of the Invention

The effect obtained by the typical invention disclosed in this application will be briefly described as follows.

(1) It is possible to appropriately display the information necessary for the safe driving in accordance with the running state of a vehicle.

(2) It is possible to contribute to the safe driving by (1) above.

BRIEF DESCRIPTIONS OF THE DRAWINGS

FIG. 8 is an explanatory diagram showing an example of a configuration of an other-unit-failure determination table in a unit-failure determination unit of FIG. 4;

FIGS. 14A and 14B are explanatory diagrams showing an example of a configuration of an AR-HUD according to a second embodiment.

DETAILED DESCRIPTION OF PREFERRED EMBODIMENTS

Figure 1:
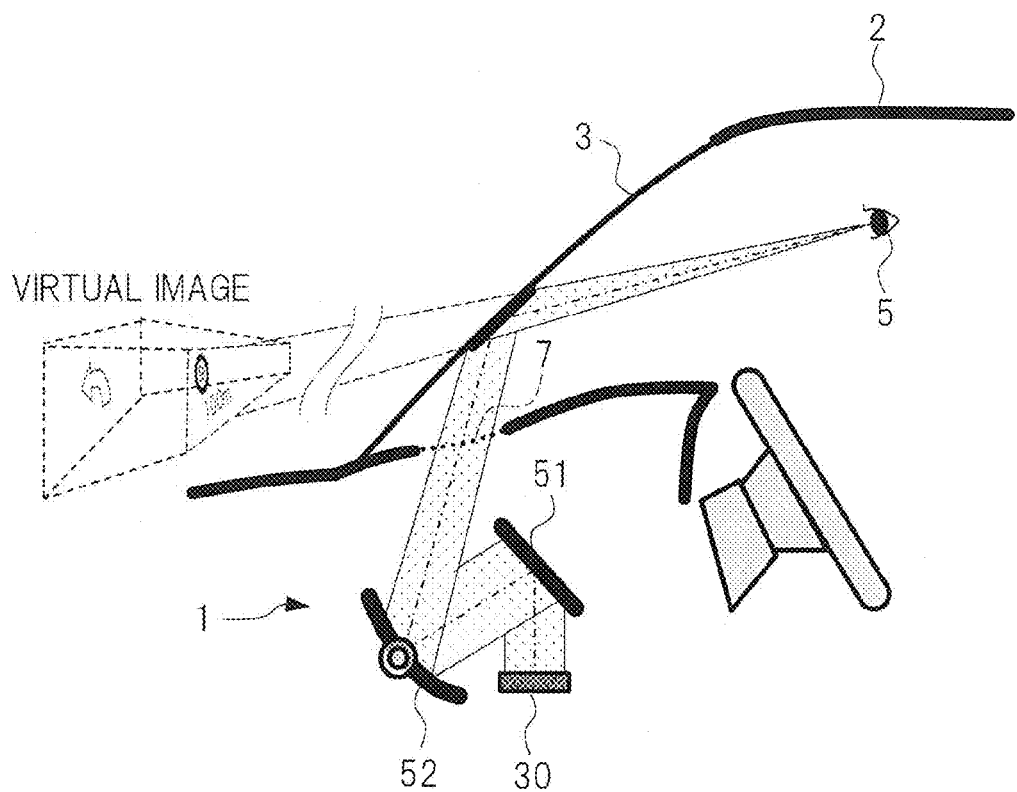
FIG. 1 is an explanatory diagram showing an outline of an example of an operation concept in an AR-HUD according to a first embodiment.

The same members are denoted by the same reference characters in principle throughout the drawings for describing the embodiments, and the repetitive description thereof will be omitted. Note that hatching is used in some cases even in a plan view so as to make the drawings easy to see.

First Embodiment

Hereinafter, embodiments of the present invention will be described in detail.

<Operation of AR-HUD>

FIG. 1 is an explanatory diagram showing an outline of an example of an operation concept in a HUD apparatus to implement an AR function (hereinafter, referred to as "AR-HUD" in some cases) according to a first embodiment.

An AR-HUD 1 which is a head up display apparatus projects a video displayed on a video display apparatus 30 configured of a projector, a liquid crystal display (LCD) or the like onto a windshield 3 of a vehicle 2, by reflecting the video by a mirror 51 and a mirror 52 so as to pass through an opening 7 as shown in FIG. 1. The mirror 51 and the mirror 52 are, for example, free-form mirrors or mirrors asymmetric in light axis.

A driver 5 sees the video projected on the windshield 3, thereby visually recognizing the video as a virtual image through the transparent windshield 3 in front of it. In this embodiment, for example, a position of the video projected on the windshield 3 is adjusted by adjusting an angle of the mirror 52, and a display position of the virtual image seen by the driver 5 can be adjusted in a vertical direction. Further, the AR function is implemented by adjusting the display position so as to superimpose the virtual image over a landscape outside the vehicle (road, building, people or other).

In addition, the AR-HUD 1 can display more information on the windshield 3 by expanding the display region of the video projected on the windshield 3. This can be realized by, for example, increasing an area of the mirror 52 or the like.

<Configuration Example of AR-HUD>

Figure 2:
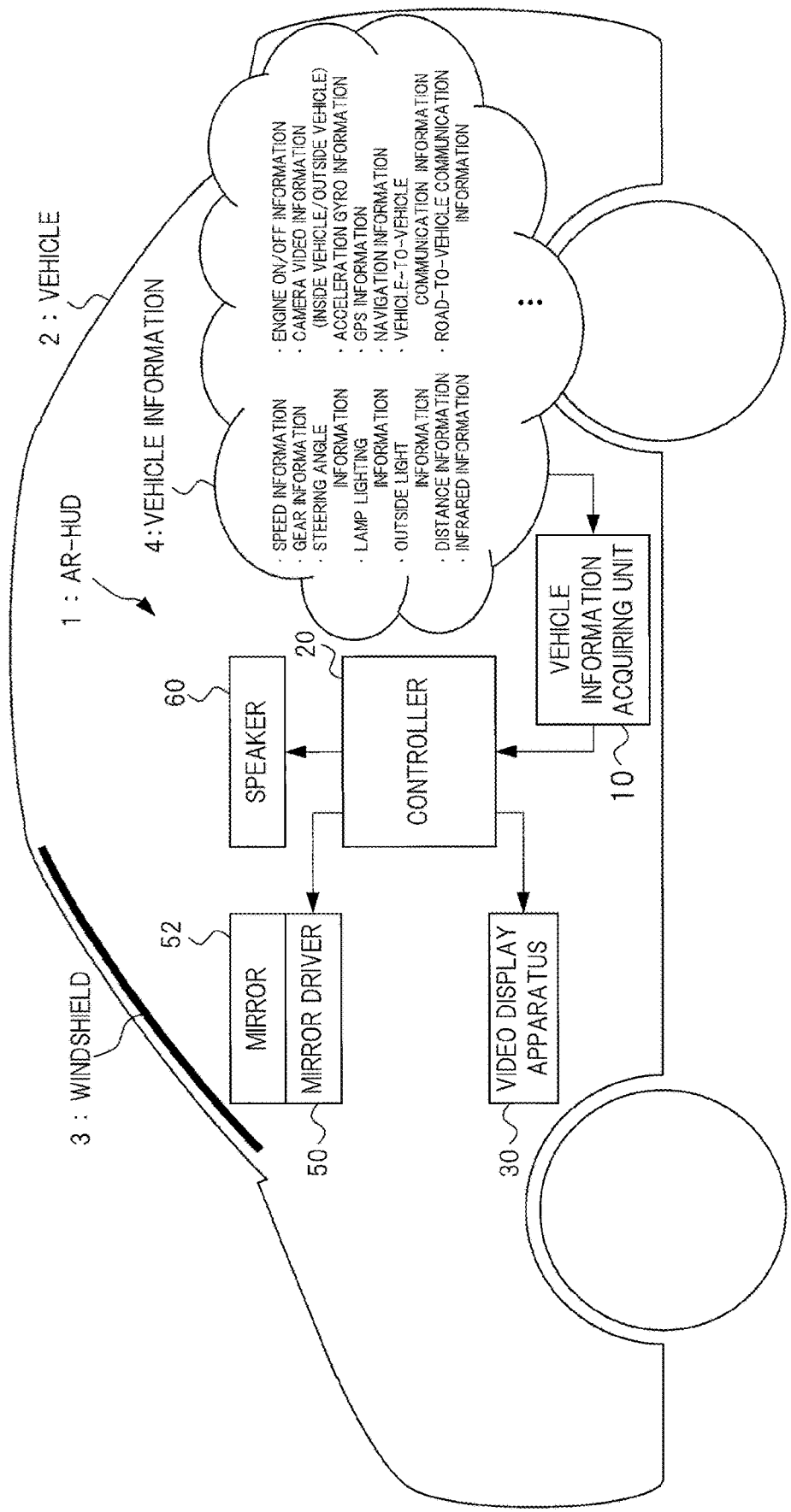
FIG. 2 is a functional block diagram showing an outline of an overall configuration example of the AR-HUD according to the first embodiment.

FIG. 2 is a functional block diagram showing an outline of an overall configuration example of the AR-HUD 1 according to the first embodiment.

As shown in FIG. 2, the AR-HUD 1 installed in the vehicle 2 includes a vehicle information acquiring unit 10, a controller 20, a video display apparatus 30, a mirror driver 50, the mirror 52, a speaker 60 and others. Note that, in the example of FIG. 2, a shape of the vehicle 2 is shown like a passenger car, but the shape of the vehicle 2 is not limited to this and the AR-HUD 1 can be applied to general vehicles as appropriate.

The vehicle information acquiring unit 10 is composed of information acquiring devices such as various types of sensors described later installed in each unit of the vehicle 2, and acquires and outputs vehicle information 4 by detecting various events caused in the vehicle 2 and detecting and acquiring various parameter values relating to the running state at predetermined intervals.

As shown in the drawing, the vehicle information 4 may include, for example, speed information and gear information of the vehicle 2, steering angle information, lamp lighting information, outside light information, distance information, infrared information, engine ON/OFF information, vehicle inside/outside camera video information, acceleration gyro information, GPS (Global Positioning System) information, navigation information, vehicle-to-vehicle communication information, road-to-vehicle communication information and others.

The controller 20 has a function to control the operation of the AR-HUD 1, and is implemented by, for example, the CPU (Central Processing Unit) and the software executed by the CPU. The controller 20 may be implemented by hardware such as microcomputer and FPGA (Field Programmable Gate Array).

As shown in FIG. 2, the controller 20 drives the video display apparatus 30 to generate the video displayed as virtual image based on the vehicle information 4 or the like acquired from the vehicle information acquiring unit 10, and projects the video onto the windshield 3 by reflecting it by the mirror 52 or the like as appropriate. Then, the controller 20 executes the control to adjust a display position of a display region 6 of the virtual image.

As described above, the video display apparatus 30 is the device configured of, for example, a projector or a LCD, and it generates the video for displaying a virtual image based on the instruction from the controller 20 and projects and displays the video.

The mirror driver 50 adjusts an angle of the mirror 52 based on the instruction from the controller 20, thereby adjusting the position of the display region 6 of the virtual image in the vertical direction.

The speaker 60 performs the audio output relating to the AR-HUD 1. For example, the speaker 60 can perform the audio guidance of the navigation system and the audio output when notifying the driver 5 of a warning or the like by the AR function.

<Configuration Example of Hardware>

Figure 3:
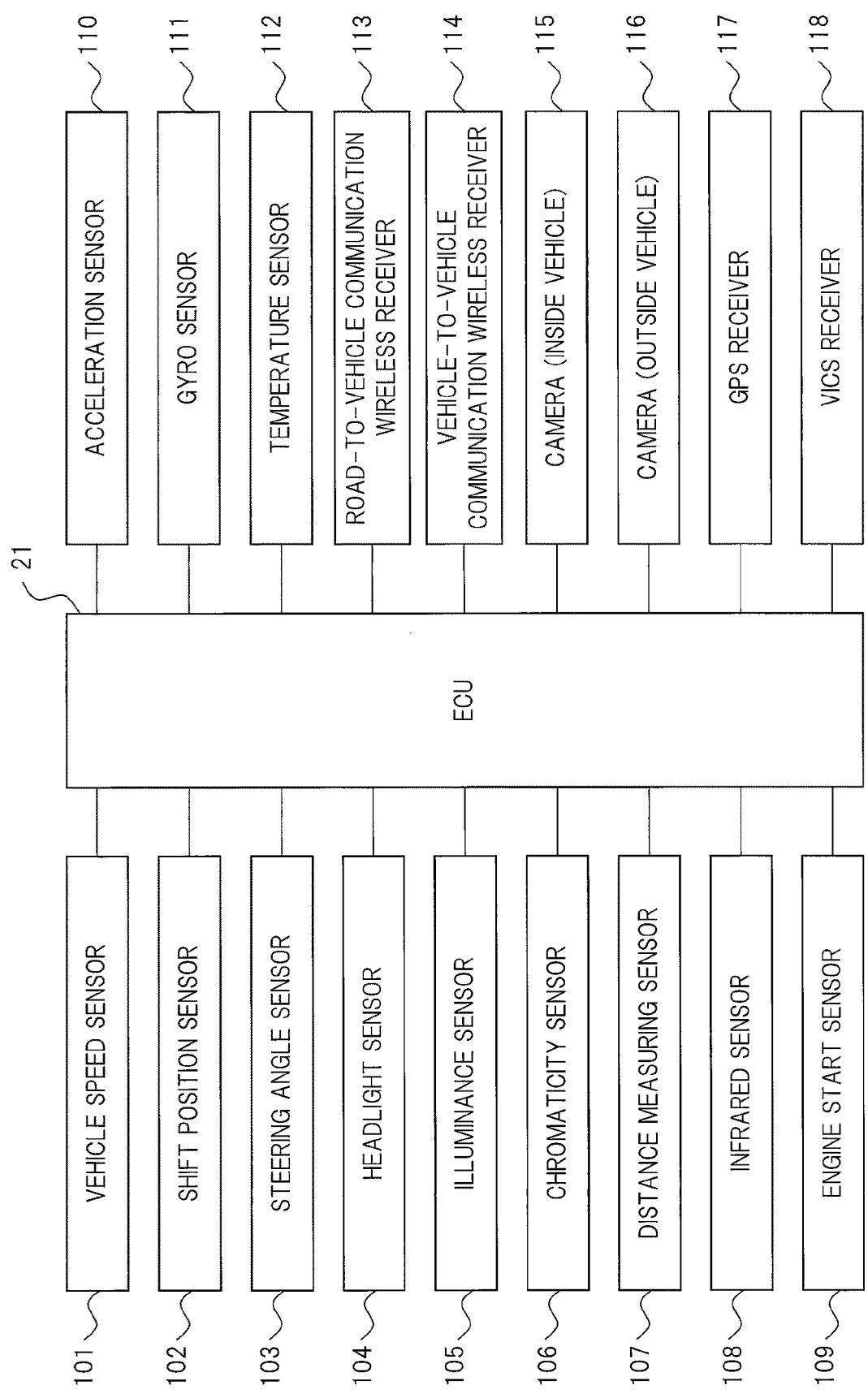
FIG. 3 is an explanatory diagram showing an outline of an example of hardware configuration relating to acquisition of vehicle information in the AR-HUD of FIG. 2.

FIG. 3 is an explanatory diagram showing an outline of an example of hardware configuration relating to the acquisition of the vehicle information 4 in the AR-HUD 1 of FIG. 2.

Here, the hardware configuration of a part of the vehicle information acquiring unit 10 and the controller 20 will be mainly described. The vehicle information 4 is acquired by information acquiring devices such as various types of sensors connected to an ECU (Electronic Control Unit) 21 under the control of the ECU 21.

Examples of these information acquiring devices include a vehicle speed sensor 101, a shift position sensor 102, a steering angle sensor 103, a headlight sensor 104, an illuminance sensor 105, a chromaticity sensor 106, a distance measuring sensor 107, an infrared sensor 108, an engine start sensor 109, an acceleration sensor 110, a gyro sensor 111, a temperature sensor 112, a road-to-vehicle communication wireless receiver 113, a vehicle-to-vehicle communication wireless receiver 114, a camera (inside vehicle) 115, a camera (outside vehicle) 116, a GPS receiver 117, a VICS (Vehicle Information and Communication System, registered trademark (the same applies hereinafter)) receiver 118, and the like.

It is not always necessary to include all of these devices and other types of devices may be provided. The vehicle information 4 acquired by the provided devices can be used as appropriate.

The vehicle speed sensor 101 acquires the speed information of the vehicle 2 of FIG. 2. The shift position sensor 102 acquires the current gear information of the vehicle 2. The steering angle sensor 103 acquires the steering angle information.

The headlight sensor 104 acquires the lamp lighting information relating to ON/OFF of the headlight. The illuminance sensor 105 and the chromaticity sensor 106 acquire the outside light information. The distance measuring sensor 107 acquires the distance information between the vehicle 2 and an outside object.

The infrared sensor 108 acquires the infrared information relating to the presence or absence of an object within a short range of the vehicle 2 and the distance from the object. The engine start sensor 109 detects the engine ON/OFF information.

The acceleration sensor 110 and the gyro sensor 111 acquire the acceleration gyro information composed of acceleration and angular velocity as the information of the posture and behavior of the vehicle 2. The temperature sensor 112 acquires the temperature information inside and outside the vehicle.

The load-to-vehicle communication wireless receiver 113 and the vehicle-to-vehicle communication wireless receiver 114 acquire the road-to-vehicle communication information received through the load-to-vehicle communication between the vehicle 2 and the load, the sing, and the traffic light and the vehicle-to-vehicle communication information received through the vehicle-to-vehicle communication between the vehicle 2 and other vehicles nearby, respectively.

The camera (inside vehicle) 115 and the camera (outside vehicle) 116 capture the moving image of the situation inside and outside the vehicle, and acquire the camera video information inside the vehicle and the camera video information outside the vehicle, respectively. The camera (inside vehicle) 115 captures, for example, the posture and the position and movement of the eyes of the driver 5 of FIG. 1. It is possible to grasp the fatigue state, the position of the line of sight of the driver 5 and the like by analyzing the obtained moving image.

Also, the camera (outside vehicle) 116 captures surrounding situations in front and back of the vehicle 2. It is possible to grasp the presence or absence of moving objects such as other vehicles and people in the vicinity, buildings and topography, rain and snow, road surface conditions such as freezing and unevenness, traffic signs and the like by analyzing the obtained moving image.

The GPS receiver 117 and the VICS receiver 118 acquire the GPS information obtained by receiving the GPS signal and the VICS information obtained by receiving the VICS signal, respectively. These may be implemented as a part of the car navigation system configured to acquire and use such information.

<Configuration Example of Controller>

Figure 4:
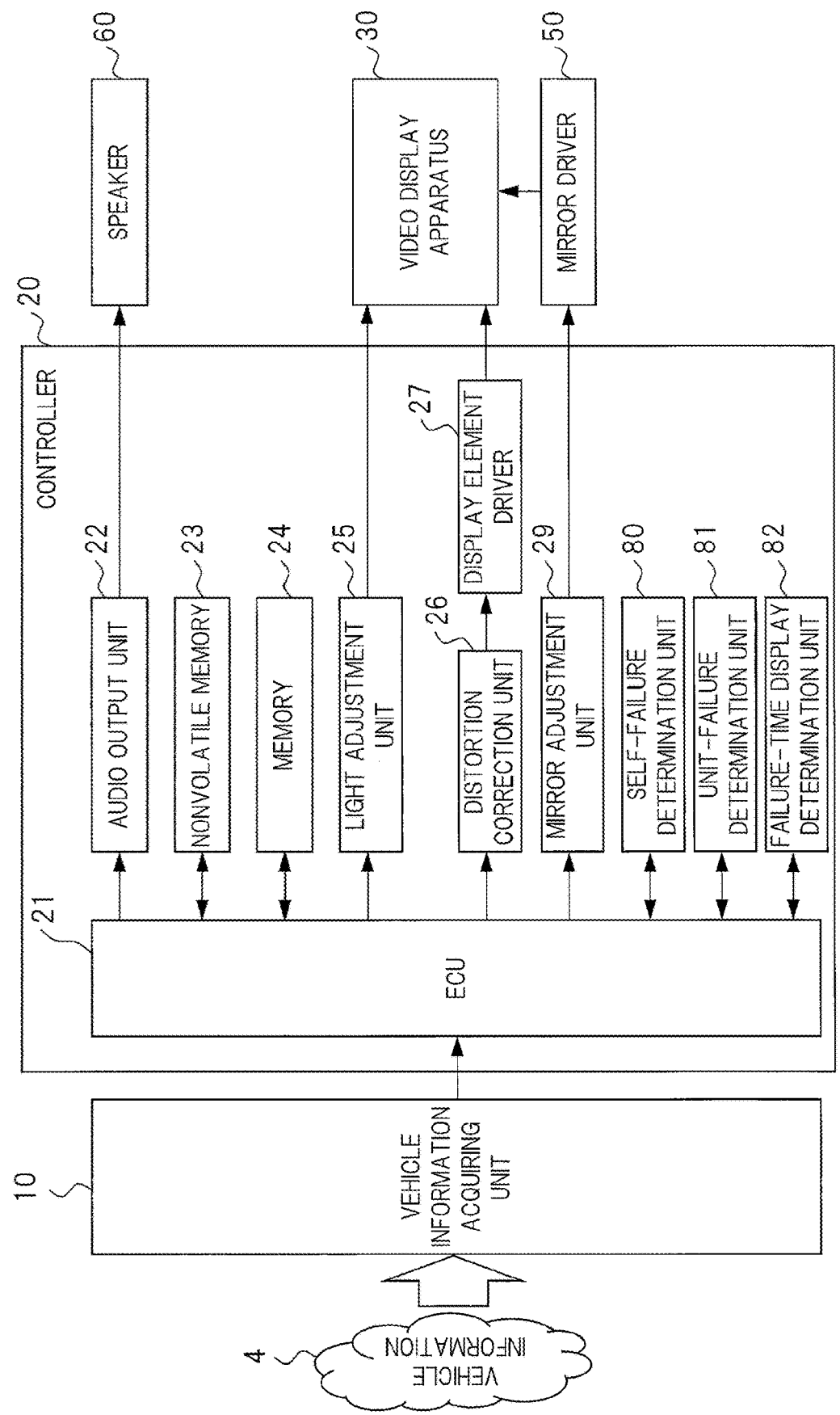
FIG. 4 is a functional block diagram showing details of the configuration example of the AR-HUD of FIG. 2.

FIG. 4 is a functional block diagram showing details of the configuration example of the AR-HUD 1 of FIG. 2.

The controller 20 includes, in more detail, respective units such as the ECU 21, an audio output unit 22, a nonvolatile memory 23, a memory 24, a light source adjustment unit 25, a distortion correction unit 26, a display element driver 27, a mirror adjustment unit 29, a self-failure determination unit 80, a unit-failure determination unit 81, and a failure-time display determination unit 82.

As shown in FIG. 3, the ECU 21 acquires the vehicle information 4 through the vehicle information acquiring unit 10, and records, stores and reads the acquired information to and from the nonvolatile memory 23 and the memory 24 as needed.

Setting information such as the setting values and parameters for various controls may be stored in the nonvolatile memory 23. Also, the ECU 21 generates video data displayed as virtual image in the AR-HUD 1 by executing the dedicated program or the like.

The audio output unit 22 outputs audio information through the speaker 60 as needed. The light source adjusting unit 25 adjusts the light emission amount of the video display apparatus 30.

The distortion correction unit 26 corrects the distortion of the video caused by the curvature of the windshield 3 by the image processing, when the video generated by the ECU 21 is projected onto the windshield 3 of the vehicle 2 by the video display apparatus 30. The display element driver 27 sends a drive signal in accordance with the video data after the correction by the distortion correction unit 26 to the video display apparatus 30 to generate the video to be projected. When it is necessary to adjust the position of the display region 6 of the virtual image, the mirror adjustment unit 29 changes the angle of the mirror 52 through the mirror driver 50, thereby moving the display region 6 of the virtual image vertically.

The self-failure determination unit 80 determines the presence or absence of the fault of the hardware or the like in the AR-HUD 1, that is, the apparatus fault. When it is determined that that the apparatus fault occurs in the AR-HUD 1, the self-failure determination unit 80 generates a fault occurrence signal and outputs it to the failure-time display determination unit 82.

The unit-failure determination unit 81 determines whether a failure occurs in the unit installed in the vehicle 2 other than the AR-HUD 1. When it is determined that the fault occurs in the other unit, the unit-failure determination unit 81 generates a fault occurrence signal and outputs it to the failure-time display determination unit 82.

The failure-time display determination unit 82 receives the fault occurrence signal output from the self-failure determination unit 80 or the unit-failure determination unit 81, and controls the video display apparatus 30 so that the virtual image being displayed does not hinder the driving of the driver.

<Process Contents>

Figure 5:
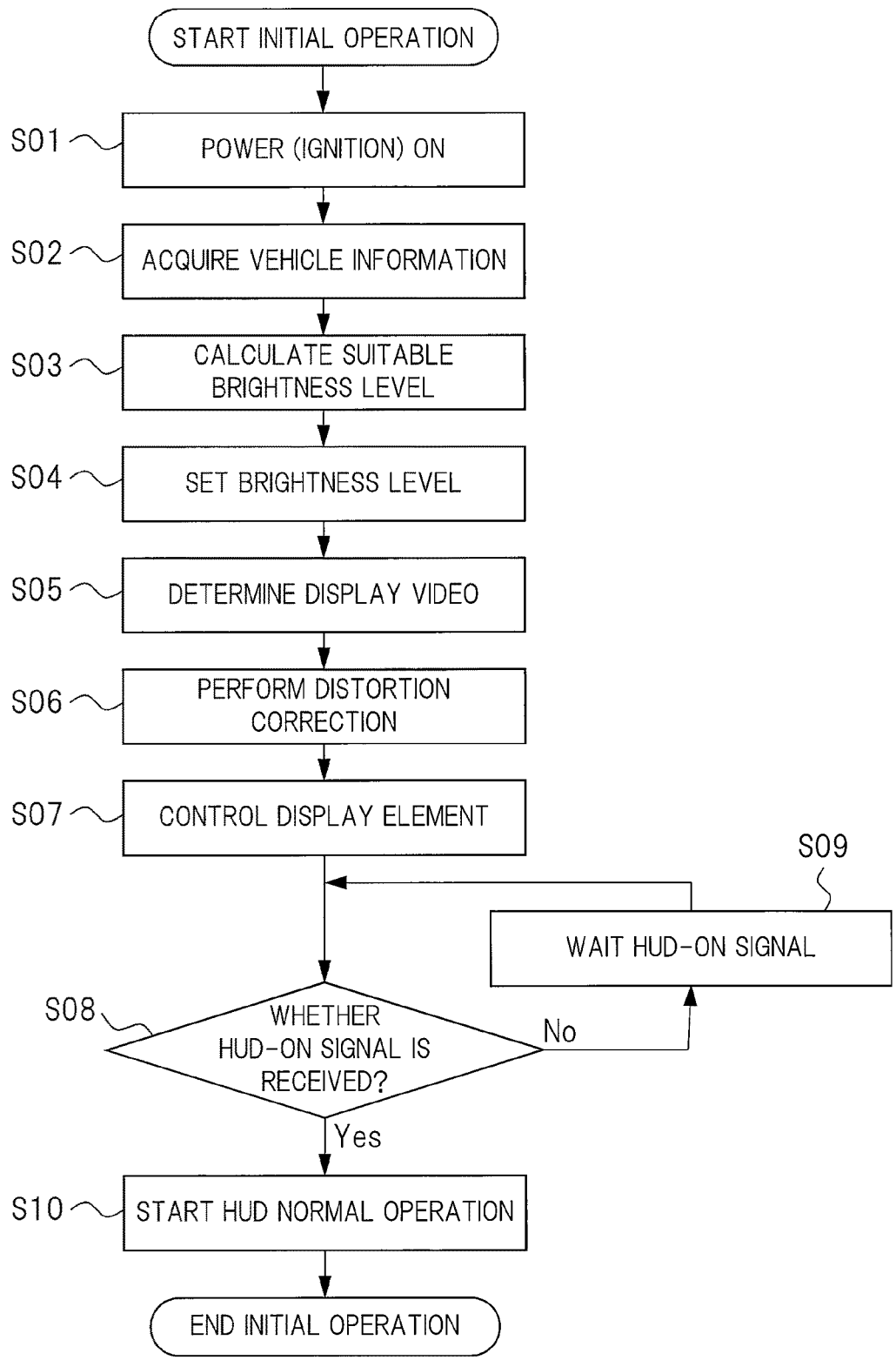
FIG. 5 is a flow chart showing an outline of an example of an initial operation in the AR-HUD of FIG. 2.

FIG. 5 is a flow chart showing an outline of an example of an initial operation in the AR-HUD 1 of FIG. 2.

When the power of the AR-HUD 1 is turned on by turning on an ignition switch in the stopped vehicle 2 (step S01), the AR-HUD 1 first acquires the vehicle information 4 by the vehicle information acquiring unit 10 based on the instruction from the controller 20 (step S02).

Then, the controller 20 calculates a suitable brightness level based on the outside light information of the vehicle information 4 acquired by the illuminance sensor 105 and the chromaticity sensor 106 (step S03), and sets the calculated brightness level by controlling the light emission amount of the video display apparatus by the light source adjustment unit 25 (step S04). For example, the brightness level is set high when the outside light is bright, and the brightness level is set low when the outside light is dark.

Thereafter, the video displayed as virtual image, for example, the initial image is determined and generated by the ECU 21 (step S05) and the process of correcting the distortion is performed to the generated video by the distortion correction unit 26 (step S06), and then the video to be projected is generated by driving and controlling the display element of the video display apparatus 30 by the display element driver 27 (step S07). In this manner, the video is projected onto the windshield 3, and the driver 5 can visually recognize the virtual image.

When the activation and start of the respective units including the series of initial operation described above are completed in the overall AR-HUD 1, a HUD-ON signal is output, and the controller 20 determines whether this signal is received or not (step S08).

When not received, the HUD-ON signal is further waited for a predetermined time (step S09), and the HUD-ON signal waiting process (step S09) is repeated until it is determined that the HUD-ON signal is received in the process of step S08.

When it is determined in the process of step S08 that the HUD-ON signal is received, the normal operation of the AR-HUD 1 described later is started (step S10), and the series of the initial operation ends.

<Example of Normal Operation>

Figure 6:
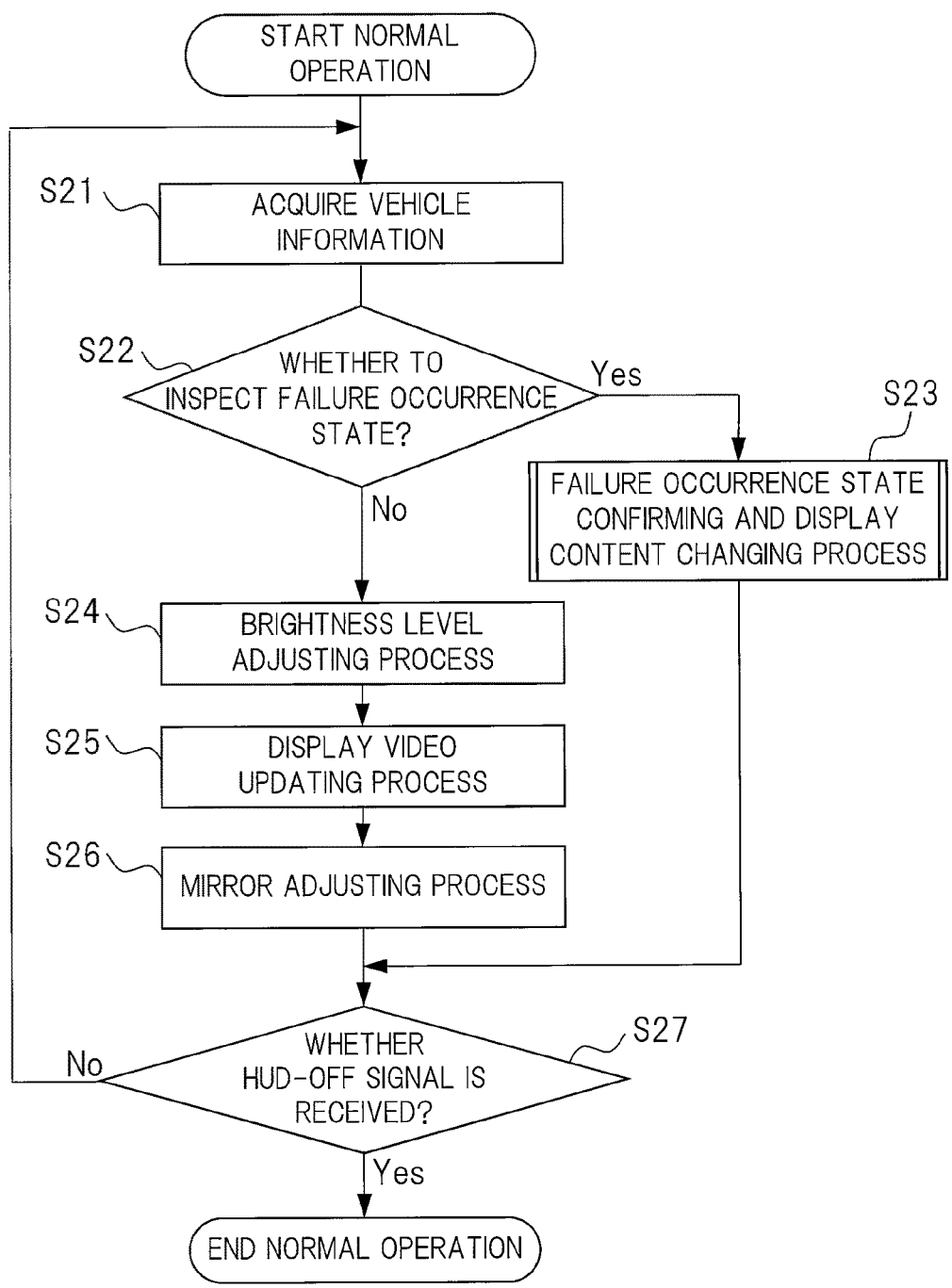
FIG. 6 is a flow chart showing an outline of an example of a normal operation in the AR-HUD of FIG. 2.

FIG. 6 is a flow chart showing an outline of an example of the normal operation in the AR-HUD 1 of FIG. 2.

The basic process flow in the normal operation is almost the same as that of the above-described initial operation shown in FIG. 5. First, the AR-HUD 1 acquires the vehicle information 4 by the vehicle information acquiring unit 10 based on the instruction from the controller 20 (step S21).

Subsequently, the controller 20 determines whether to perform the process of step S23 described later or not (step S22). The process of step S22 is performed each time when a preset time has elapsed, and it is determined that the process of step S23 is performed when the preset time has elapsed from the previous process.

When the controller 20 determines that the preset time has elapsed from the previous process, a failure occurrence state confirming and display content changing process is performed (step S23). The failure occurrence state confirming and display content changing process is the process of confirming the failure occurrence state of the AR-HUD 1 and changing the content displayed by the AR-HUD 1. Note that the process of step S23 will be described later in detail with reference to FIG. 10.

Also, when the preset time has not elapsed from the previous process in the process of step S22, the controller 20 performs a brightness level adjusting process based on the outside light information of the vehicle information 4 acquired by the illuminance sensor 105 and the chromaticity sensor 106 (step S24).

Thereafter, the ECU 21 changes the video to be displayed as virtual image from the current one as needed based on the latest vehicle information 4 acquired in the process of step S21, and determines and generates the video after the change (step S25).

Note that there may be a large number of patterns to change the display content based on the vehicle information 4 in accordance with the content of the acquired vehicle information 4 and the combinations thereof. For example, there may be various patterns such as the case where the speed display value which is always displayed is changed when the speed information is changed and the case where a guide arrow graphic is displayed/deleted or a shape and display position of the arrow are changed based on the navigation information.

Thereafter, an adjustment/correction process to maintain the visibility and appropriateness of the display content is performed in accordance with the running state of the vehicle 2. When it is necessary to adjust the position of the display region 6 of the virtual image, a mirror adjustment process of changing the angle of the mirror 52 through the mirror driver 50 to move the display region 6 of the virtual image vertically is performed (step S26).

When the power is turned off with the stop of the vehicle 2 while performing the series of the normal operation described above, a HUD-OFF signal is output to the AR-HUD 1, and the controller 20 determines whether this signal is received or not (step S27).

If the HUD-OFF signal is not received, the flow returns to the process of step S21 and the series of the normal operation is repeated until the HUD-OFF signal is received. When it is determined that the HUD-OFF signal is received, the series of the normal operation ends.

Subsequently, a fault determination technology by the self-failure determination unit 80 and the unit-failure determination unit 81 by the process of step S22 of FIG. 6 will be described.

<Configuration Example of Self-Failure Determination Table>

Figure 7:
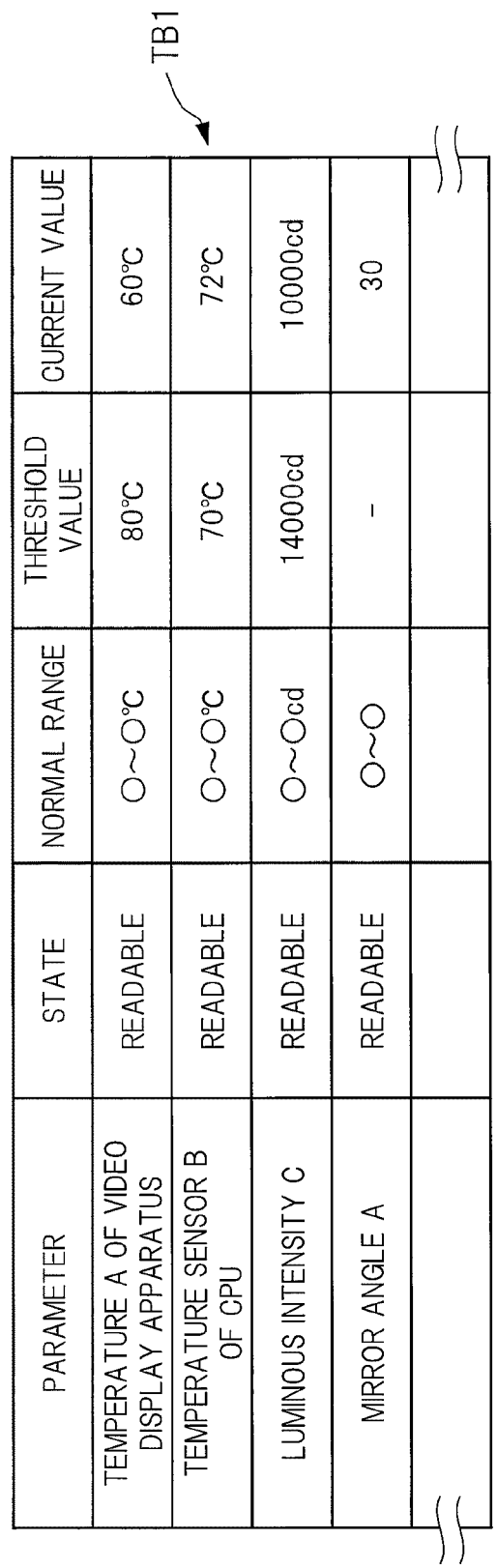
FIG. 7 is an explanatory diagram showing an example of a configuration of a self-failure determination table in a self-failure determination unit of FIG. 4.

FIG. 7 is an explanatory diagram showing an example of a configuration of a self-failure determination table TB1 in the self-failure determination unit 80 of FIG. 4.

The self-failure determination unit 80 determines whether the fault occurs in the AR-HUD 1 with reference to the self-failure determination table TB1. The self-failure determination table TB1 is stored in, for example, a memory (not shown) in the self-failure determination unit 80 or the like. Alternatively, the self-failure determination table TB1 may be stored in the nonvolatile memory 23 in the controller 20 of FIG. 4, a memory (not shown) in the controller 20 or the like.

Data components of the self-failure determination table TB1 include parameter, state, normal range, threshold value, current value and the like as shown in FIG. 7. The current value of the parameter in the self-failure determination table TB1 serves as the apparatus information.

The parameter is the information that the self-failure determination unit 80 refers to when determining whether the fault occurs in the AR-HUD 1 or not, and is the data acquired by the self-failure determination unit 80.

These parameters include, for example, the temperature of the video display apparatus 30, the temperature of the controller 20, that is, the CPU, the luminous intensity of the light emitted by the video display apparatus 30, the angle of the mirror 52, and the like. The parameters are regularly acquired at certain intervals.

Note that the threshold value of the temperature of the CPU is set to a temperature before a failure or the like occurs in the CPU, that is, a preventive temperature before the CPU completely falls into a failure such as runaway. This is because, if the threshold value of the temperature of the CPU is set to a high temperature, for example, a temperature just before the CPU falls into a failure, there is a fear that the runaway or the malfunction of the CPU occurs immediately after the failure is determined as described above and the control of the AR-HUD 1 becomes difficult, and thus, a margin is given to the threshold value.

The state shows the acquisition state of the parameter, and it becomes "readable" when the information of the parameter can be acquired and it becomes "unreadable" when the sensor and the like break down and the parameter cannot be acquired.

The normal range shows the range of normal value of each parameter. The current value shows the value at the time when the self-failure determination unit 80 acquires the parameter. Therefore, the current value is updated each time when the self-failure determination unit 80 acquires the parameter.

The self-failure determination unit 80 compares the acquired parameters with the threshold values set to the respective parameters in advance, and determines that the fault occurs in the AR-HUD 1 when the current value of the acquired parameter exceeds the set threshold value.

For example, when the temperature of the video display apparatus 30 exceeds 80° C. corresponding to the threshold value, since there is a fear that the malfunction of the video display apparatus 30 or the like occurs, the self-failure determination unit 80 determines that a failure has occurred or will occur in the AR-HUD 1 and generates and outputs the fault occurrence signal.

For example, other parameters showing the operation state of the sensors to acquire the parameters of FIG. 7 may be acquired in addition to the parameters shown in FIG. 7.

For example, the temperature sensor is used for each of the acquisition of the temperature of the video display apparatus 30 and the acquisition of the temperature of the CPU. Thus, information such as the operating time, the cumulative operating time, and the cumulative error count of respective sensors such as the temperature sensor is acquired as other parameters.

For example, the continuous operating time shows the time when the temperature sensor is continuously operated. The cumulative operating time is the cumulative value of the operating time of the temperature sensor or the like. The cumulative error count shows the number of times of the measurement errors when the temperature sensor or the like measures the temperature information.

Threshold values are respectively set in advance to these other parameters, and when exceeding the threshold values regarding the operating time, the cumulative operating time, and the cumulative error count other than the parameters shown in FIG. 7, there is a fear that the sensor may have reached its end of life, and as a result, it is determined that there is a high possibility that the failure or the like occurs in the AR-HUD 1 and the fault occurrence signal is generated and output.

<Configuration Example of Other-Unit-Failure Determination Table>

FIG. 8 is an explanatory diagram showing an example of a configuration of an other-unit-failure determination table TB2 in the unit-failure determination unit 81 of FIG. 4.

As shown in FIG. 8, the other-unit-failure determination table TB2 includes information such as communication partner, prescribed communication interval, failure determination threshold value, destination, upper limit of consecutive error count, and current consecutive error count.

The communication partner indicates a unit which regularly communicates with the controller 20. In this case, the communication partner is the unit in the vehicle information acquiring unit 10 that acquires the vehicle information 4 of FIG. 2, for example, the GPS receiver 117, the vehicle speed sensor 101, the camera 116 and the like of FIG. 3.

The prescribed communication interval indicates the time of prescribed communication interval between the controller 20 and the unit. The failure determination threshold value is the threshold value used when determining whether there is the fault in the communication between the controller 20 and the unit.

When the time of the communication interval between the controller 20 and the unit and the time of the failure determination threshold value are compared with each other and the time when the communication is interrupted exceeds the time of the failure determination threshold value, the unit-failure determination unit 81 generates and outputs the fault occurrence signal.

The destination indicates the unit to which the controller 20 sends the data. The upper limit of consecutive error count indicates an upper limit value of the number of consecutive transmission errors between the controller 20 and the unit. The current consecutive error count shows the number of current consecutive transmission errors between the controller 20 and the unit.

Also, the unit-failure determination unit 81 compares the current consecutive error count and the upper limit value of the consecutive error count, and generates and outputs the fault occurrence signal when the current consecutive error count exceeds the upper limit value of the consecutive error count. Here, the time of the communication interval between the controller 20 and the unit and the current consecutive error count serve as the unit information.

Subsequently, the operation of the display content changing process at the time of occurrence of fault by the failure-time display determination unit 82 will be described.

<Display Example>

Figure 9:
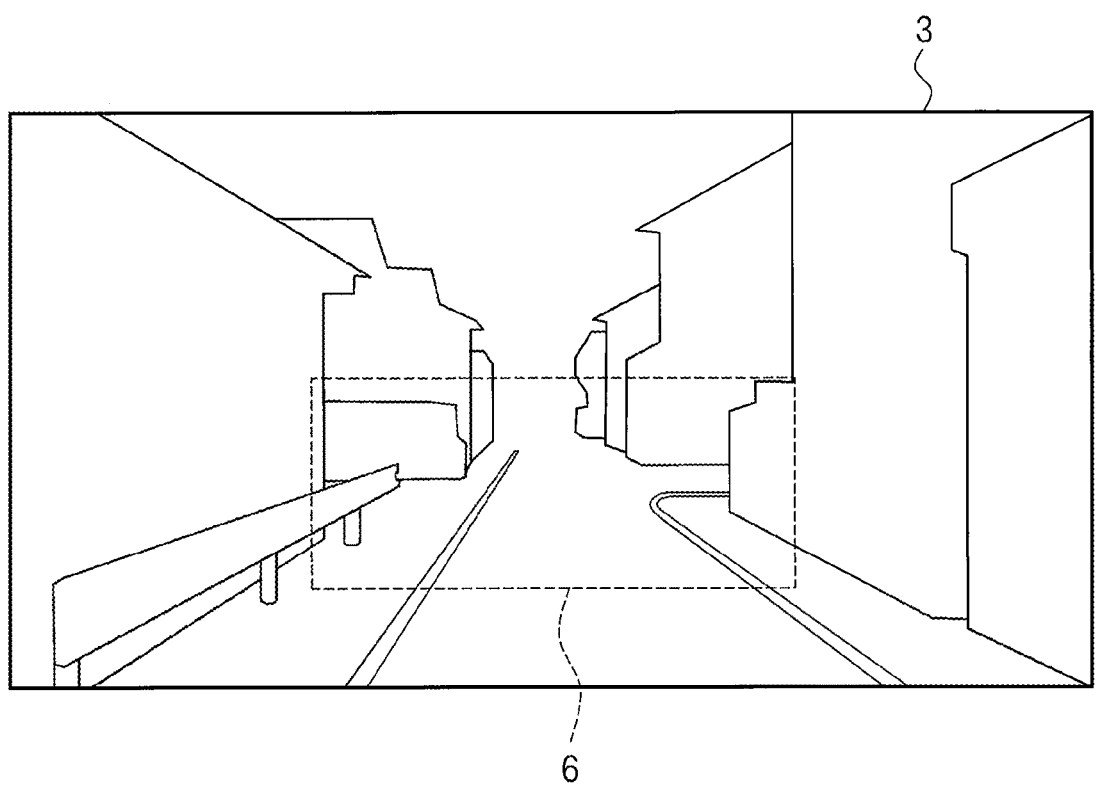
FIG. 9 is an explanatory diagram showing an example of a display on a windshield at the time of occurrence of failure by a failure-time display determination unit in a controller of FIG. 4.

FIG. 9 is an explanatory diagram showing an example of a display on the windshield 3 at the time of occurrence of fault by the failure-time display determination unit 82 in the controller 20 of FIG. 4.

FIG. 9 schematically shows the front landscape that the driver 5 of the vehicle 2 of FIG. 2 visually recognizes from the driver's seat through the windshield 3 and an example of the state of the display region 6 in which the virtual image projected by the AR-HUD 1 onto the windshield 3 is displayed.

When the fault occurrence signal is received, the failure-time display determination unit 82 performs the process of shutting down the AR-HUD 1 itself. By shutting down the AR-HUD 1, nothing is displayed in the display region 6 indicated by dotted lines as shown in FIG. 9. Thus, it is possible to secure the field of view of the driver 5 and to maintain the safe driving.

The AR-HUD 1 may be shut down by cutting off the power supplied to the AR-HUD 1 by a unit operated in cooperation with the AR-HUD 1, specifically, an ECU or the like in the automatic driving system that assists the automatic driving of the vehicle 2. In that case, the failure-time display determination unit 82 outputs a control signal to the ECU in the unit described above. When receiving the control signal from the failure-time display determination unit 82, the ECU performs the process of cutting off the power supplied to the AR-HUD 1.

Alternatively, the failure-time display determination unit 82 may perform the process of cutting off the power supplied to the AR-HUD 1. In the process of shutting down the AR-HUD 1 by the failure-time display determination unit 82, the failure-time display determination unit 82 outputs a flag indicating that the shutdown process is performed.

The flag output by the failure-time display determination unit 82 is stored in, for example, the nonvolatile memory 23 of FIG. 4. Then, if the flag is present when the AR-HUD 1 is started, the controller 20 performs a self-diagnosis to confirm that there are no faults in various parameters, and then performs the initial operation.

Also, as another process of preventing the virtual image from being displayed in the display region 6, for example, the failure-time display determination unit 82 controls the light source adjustment unit 25 through the ECU to perform the process of adjusting the light emission amount of the video display apparatus 30.

Specifically, when the video display apparatus 30 is the LCD, the backlight which is the light source provided in the LCD is turned off. As a result, it is possible to achieve the state where the AR-HUD 1 is performing the operation of displaying the virtual image, but nothing is displayed in the display region 6.

The advantage in the case of achieving the state where the backlight is turned off to display nothing in the display region 6 is that the virtual image can be displayed in the display region again even after the backlight is turned off.

For example, it is assumed that the backlight of the LCD is turned off because the temperature of the CPU exceeds the threshold value in FIG. 7 and the virtual image is not displayed in the display region 6. In this case, since the AR-HUD 1 is not shut down, the controller 20 is operating.

As shown in FIG. 6, the inspection of the failure occurrence state (process of step S22) is performed at certain intervals during the operation of the AR-HUD 1. Therefore, even after the backlight of the LCD is turned off, the parameter monitoring is continued. If it is determined that the temperature of the CPU becomes lower than the threshold value in the process of step S22 after the backlight of the LCD is turned off, the controller 20 can execute the control to turn on the backlight again.

Note that it is also possible to configure the backlight so as to be turned on immediately when the current value of the parameter becomes equal to or smaller than the threshold value, or configure the backlight so as to be turned on when a predetermined time has elapsed after the current value of the parameter becomes equal to or smaller than the threshold value.

Consequently, the virtual image can be displayed again in the display region 6 without performing the process of the shutdown and restart of the AR-HUD 1, and the convenience of the driver 5 can be improved.

Subsequently, the failure occurrence state confirming and display content changing process described above will be described in detail.

<Example of Failure Occurrence State Confirming and Display Content Changing Process>

Figure 10:
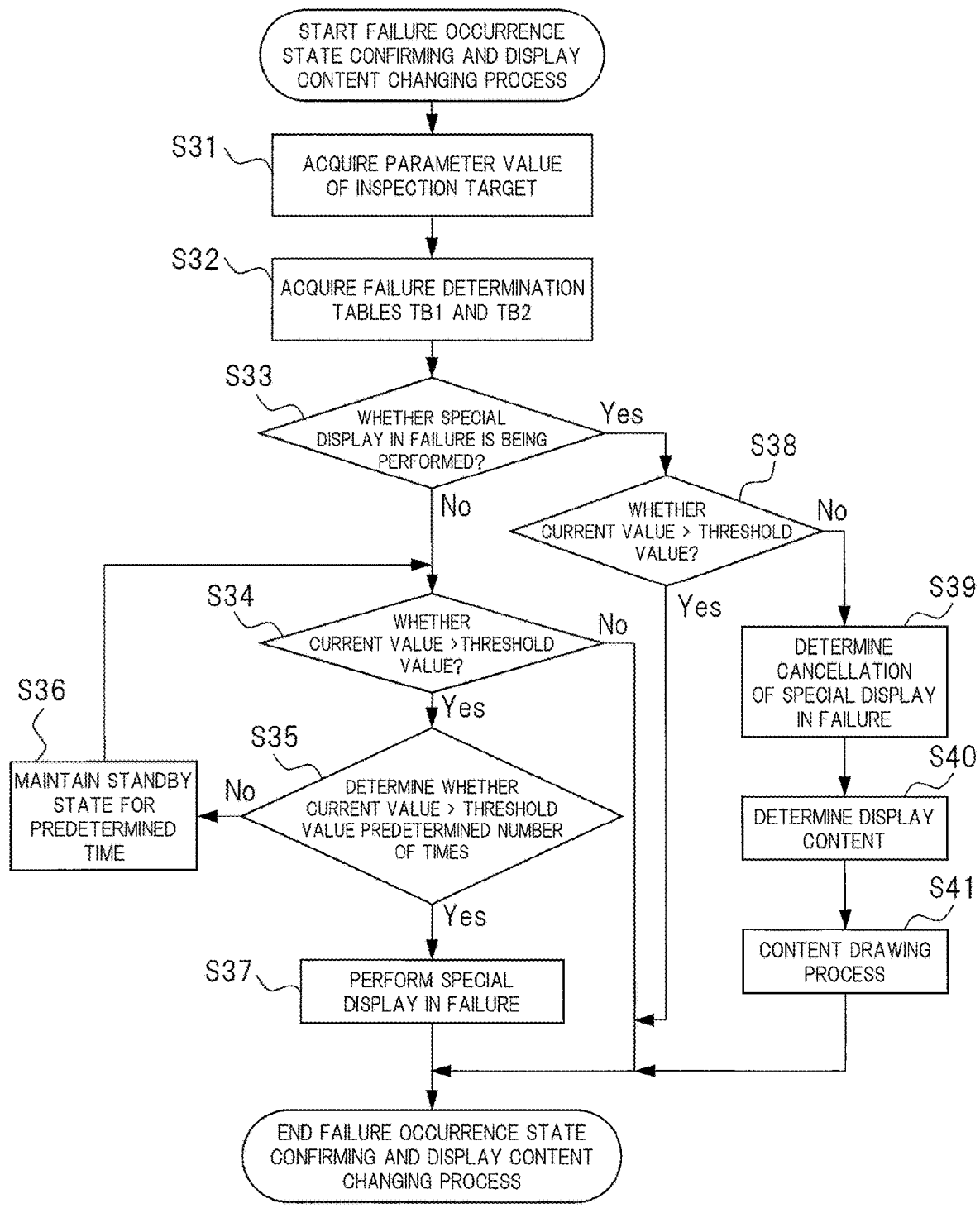
FIG. 10 is a flow chart showing an example of a failure occurrence state confirming and display content changing process which is a process of step S23 of FIG. 6.

FIG. 10 is a flow chart showing an example of the failure occurrence state confirming and display content changing process which is the process of step S23 of FIG. 6.

Note that FIG. 10 shows the process in the case where the backlight of the LCD described above is turned off to prevent the virtual image from being display in the display region 6 as an example of the display content changing process.

First, the self-failure determination unit 80 and the unit-failure determination unit 81 each acquire the target parameters (step S31) and store the acquired parameters in the self-failure determination table TB1 of FIG. 7 and the other-unit-failure determination table TB2 of FIG. 8 (step S32).

Subsequently, the controller 20 determines whether a special display in the failure is being performed or not (step S33). In FIG. 10, the special display is to perform the display different from that in the case where the virtual image is normally displayed in the AR-HUD 1 such as the turning off of the backlight of the LCD.

When it is determined in the process of step S33 that the special display is not being performed, that is, the backlight of the LCD is being turned on, the self-failure determination unit 80 and the unit-failure determination unit 81 determine whether the current values of the acquired various parameters exceed the threshold values or not with reference to the self-failure determination table TB1 of FIG. 7 and the other-unit-failure determination table TB2 of FIG. 8 (step S34).

When the current value of the parameter does not exceed the threshold value, the failure occurrence state confirming and display content changing process ends. Also, when the current value of the parameter exceeds the threshold value in the process of step S34, it is determined whether the current value of the acquired parameter exceeds the threshold value again (step S35). The process of the step S35 is repeated a predetermined number of times. The reason why the process of step S35 is repeatedly performed is to prevent the erroneous determination of the occurrence of the failure due to the case where the current value of the parameter exceeds the threshold value only once by the malfunction of the sensor or the like.

When it is determined in the process of step S35 that the current value of the parameter does not exceed the threshold value, a standby state is maintained for a predetermined time (step S36), and then the flow returns to the process of step S34. Also, when it is determined in the process of step S35 that the current value of the parameter exceeds the threshold value, the special display is performed, that is, the backlight of the LCD is turned off (step S37)

In addition, when it is determined in the process of step S33 that the special display is being performed, that is, the backlight of the LCD is turned off, the self-failure determination unit 80 and the unit-failure determination unit 81 determine whether the current values of the acquired various parameters exceed the threshold values or not with reference to the self-failure determination table TB1 of FIG. 7 and the other-unit-failure determination table TB2 of FIG. 8 (step S38).

When the current value of the parameter exceeds the threshold value in the process of step S38, the failure occurrence state confirming and display content changing process ends and the backlight is continued to be turned off. Also, when the current value of the parameter does not exceed the threshold value in the process of step S38, there is no failure occurrence, and thus the special display being performed is cancelled, that is, the backlight of the LCD is turned on (step S39).

Thereafter, the controller 20 determines the content to be displayed in the display region 6 of the AR-HUD 1 (step S40) and performs the display process of the determined content (step S41).

In the manner described above, the failure occurrence state confirming and display content changing process ends.

Note that FIG. 10 shows an example in which the self-failure determination unit 80 and the unit-failure determination unit 81 each detect the fault, but it is also possible to perform only the detection of the apparatus fault by the self-failure determination unit 80. Alternatively, it is also possible to perform only the detection of the unit fault by the unit-failure determination unit 81.

<Problems>

Here, the problems when the abnormal display occurs due to the failure or the like in the AR-HUD 1 will be described.

Figure 11B:
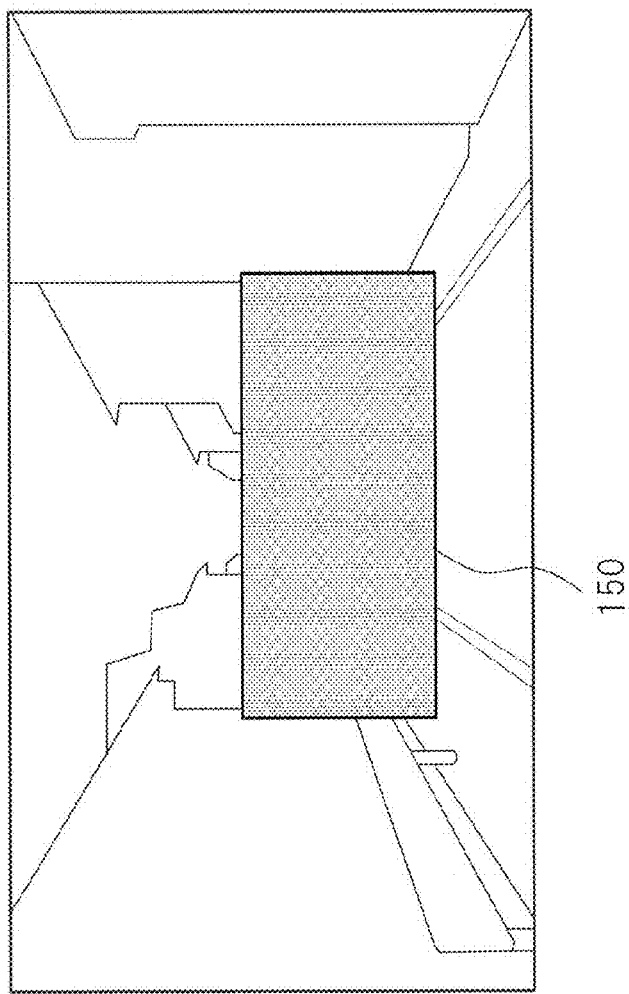
FIGS. 11A AND 11B are explanatory diagrams showing an example of an abnormal display screen at the time of occurrence of failure of the AR-HUD studied by the inventors of the present invention.
Figure 11A:
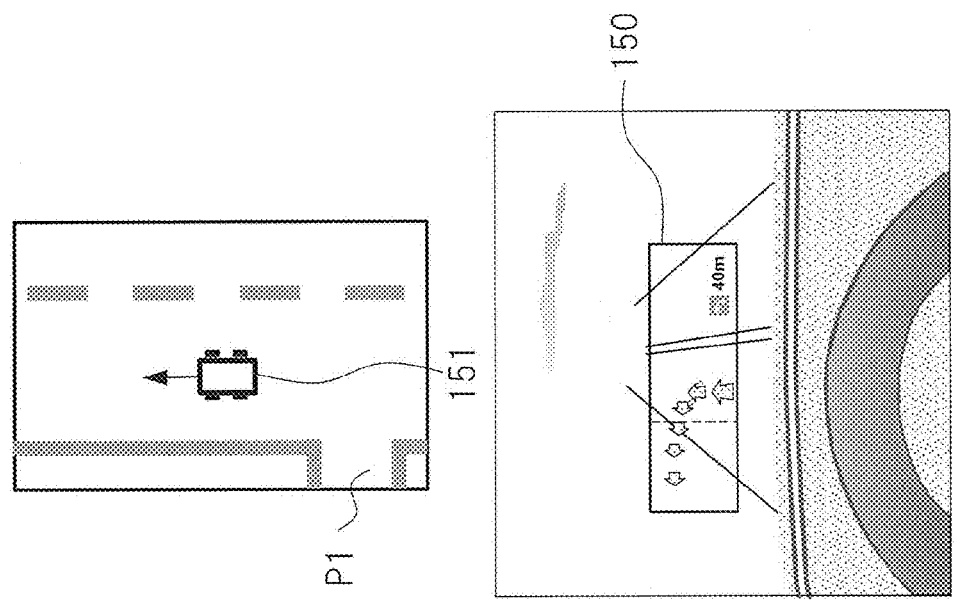

FIGS. 11A and 11b are explanatory diagrams showing an example of an abnormal display screen at the time of occurrence of failure of the AR-HUD studied by the inventors of the present invention. Also, FIG. 12 is an explanatory diagram showing another example of the abnormal display screen at the time of occurrence of failure of the AR-HUD studied by the inventors of the present invention.

FIG. 11A shows an example of an abnormal display of a guide display by a navigation in a virtual display region 150 visually recognized by a driver through a windshield from a driver's seat. In this case, as shown in the diagram on an upper side of FIG. 11A, although a vehicle 151 has passed a left-turn point P1 at an intersection, the display of the left-turn guidance is still displayed. Also, as to a distance meter showing a distance to the left-turn point P1, the display is wrong.

In addition, FIG. 11B shows an example in which all or almost all of the display region 150 is displayed so as to be filled due to the abnormal display. FIG. 12 shows a state where a number of unnecessary and irrelevant objects are displayed in the whole of the display region 150.

Figure 12:
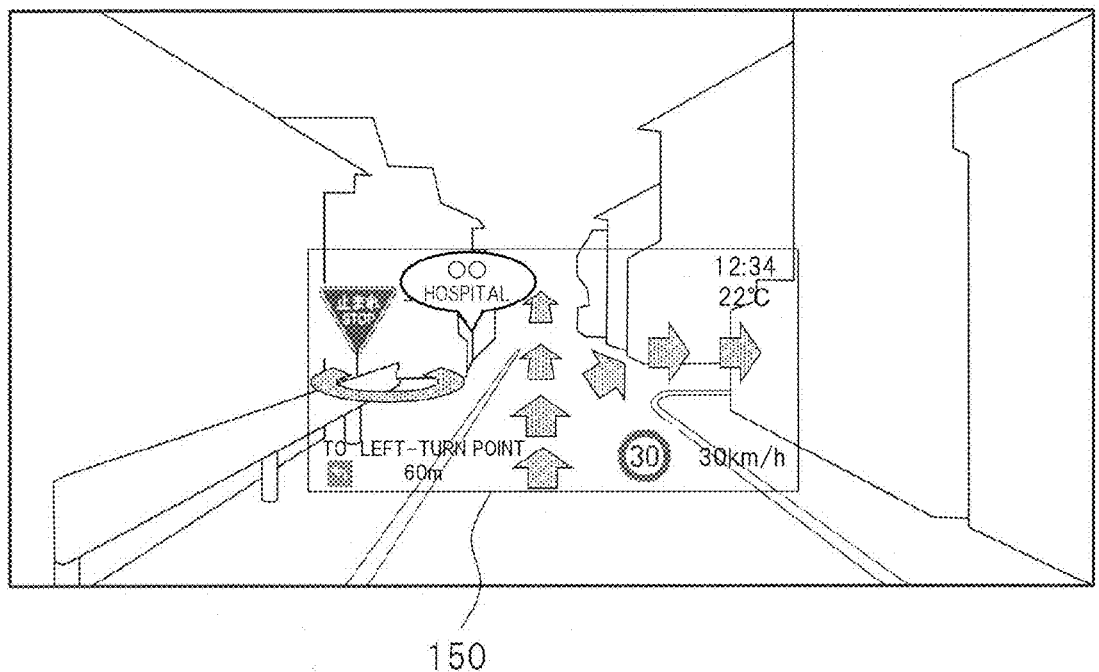
FIG. 12 is an explanatory diagram showing another example of the abnormal display screen at the time of occurrence of failure of the AR-HUD studied by the inventors of the present invention.

When a failure occurs in the AR-HUD and the abnormal display is made as in the examples shown in FIG. 11 and FIG. 12, there is a fear that the driver may be distracted by the display in the display region 150 and the driving operation may be neglected. In addition, there is a fear of causing a poor visibility in the front as shown in FIG. 11B and FIG. 12.

On the other hand, in the case of the AR-HUD 1 according to the present invention, it is possible to promptly detect the failure of the AR-HUD 1 and to prevent the virtual image from being displayed in the display region 6 as shown in FIG. 9 and others. Consequently, it is possible to avoid the situation in which the driver 5 gazes the display region 6 and the attention of the driver 5 is distracted or the poor visibility in the front occurs due to the abnormal display and the important information relating to the safety is not recognized.

As described above, the AR-HUD 1 can secure the field of view of the driver 5 even when the failure occurs, and it is thus possible to improve the safety at the time of vehicle driving.

Note that the virtual image is prevented from being displayed in the display region 6 when the failure occurs in the first embodiment. Alternatively, the brightness of the display region 6, that is, the illuminance may be minimized instead of changing the display in the display region 6.

Furthermore, the region in which the virtual image is displayed may be reduced, in other words, the area thereof may be made small.

<Other Display Example>

Figure 13:
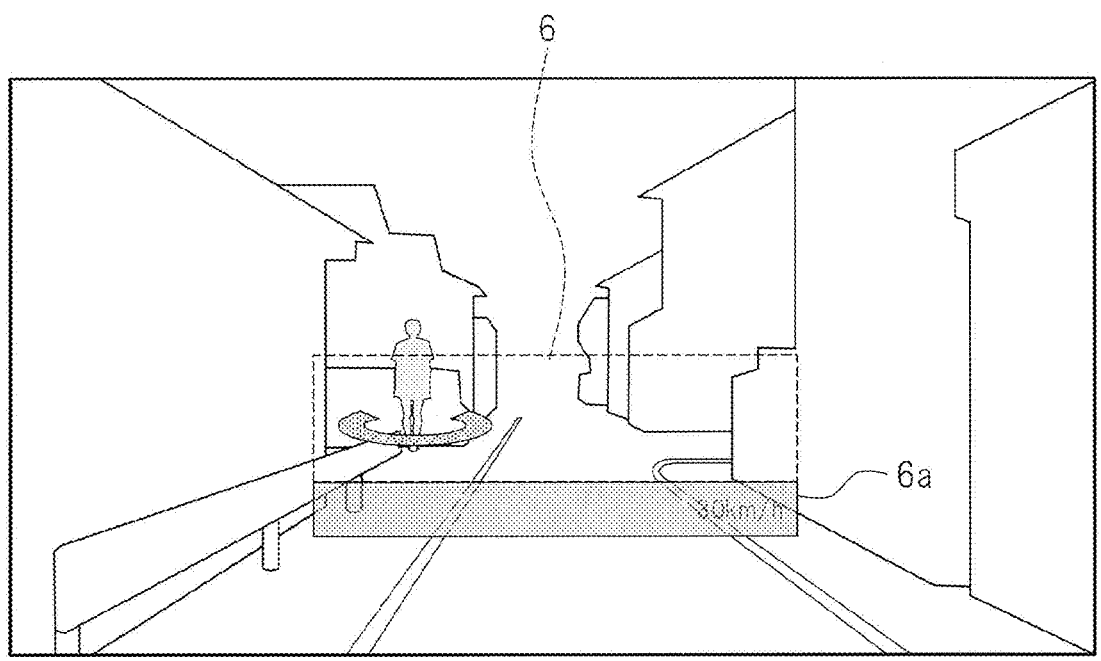
FIG. 13 is an explanatory diagram showing another example of the display on the windshield at the time of occurrence of failure by the failure-time display determination unit in the controller of FIG. 4.

FIG. 13 is an explanatory diagram showing another example of the display on the windshield 3 at the time of occurrence of failure by the failure-time display determination unit 82 in the controller 20 of FIG. 4.

In FIG. 13, dotted lines indicate the display region 6 at the time of normal operation before failure occurs, and solid lines indicate a display region 6a when the failure occurs. The virtual image is displayed in the display region 6 in the normal operation, and the display region 6 is changed into the display region 6a by reducing the area of the display region when failure occurs. It is also possible to notify the driver 5 of the occurrence of failure by displaying an alert in the display region 6a made by reducing the area of the display region.

In this manner, it is possible to secure the forward field of view of the driver 5. The reduction in the display region is particularly effective for the AR-HUD which displays the virtual image in a wide range.

Accordingly, since it is possible to make the information displayed in the display region 6 less noticeable, it is possible to reduce the poor visibility in the front.

Second Embodiment

<Configuration Example of AR-HUD>

FIGS. 14A and 14B are explanatory diagrams showing an example of a configuration of an AR-HUD 1 according to a second embodiment.

In the second embodiment, an example in which a functional film is used as a technology of preventing the virtual image from being displayed at the time of occurrence of failure will be described.

In this case, the AR-HUD 1 has the configuration in which a functional film 120 is newly provided in the configuration of FIG. 1 and FIG. 2 of the first embodiment described above. The functional film 120 changes to transparent, white and others according to the application of a voltage. For example, when a voltage is applied, the functional film 120 changes to white, preventing light from passing therethrough, and when no voltage is applied, the functional film 120 changes to transparent, allowing light to pass therethrough.

This functional film 120 is provided at the opening 7 in FIG. 1 of the first embodiment described above. Then, in the normal operation, the applied voltage is controlled to make the functional film 120 transparent so that the light passes therethrough as shown in FIG. 14A. Further, when failure occurs, the applied voltage is controlled to make the functional film 120 white so that the light does not pass therethrough as shown in FIG. 14B.

In this manner, when failure occurs, the virtual image is prevented from being displayed in the display region 6 as shown in FIG. 9. The control of the voltage applied to the functional film 120 is assumed to be executed by, for example, the failure-time display determination unit 82 of FIG. 4.

This also makes it possible to prevent the gazing of the display region 6 by the driver 5 or the occurrence of the poor visibility in the front due to the abnormal display.

As a result, it is possible to contribute to the safe driving.

In the foregoing, the invention made by the inventors of the present invention has been concretely described based on the embodiments. However, it is needless to say that the present invention is not limited to the foregoing embodiments and various changes can be made within the scope of the present invention.

Note that the present invention is not limited to the embodiments described above, and includes various modification examples. For example, the above embodiments have described the present invention in detail in order to make the present invention easily understood, and the present invention is not necessarily limited to those having all the described configurations.

Also, a part of the configuration of one embodiment may be replaced with the configuration of another embodiment, and the configuration of one embodiment may be added to the configuration of another embodiment. Furthermore, another configuration may be added to a part of the configuration of each embodiment, and a part of the configuration of each embodiment may be eliminated or replaced with another configuration.

REFERENCE SIGNS LIST

1: AR-HUD, 2: vehicle, 3: windshield, 4: vehicle information, 5: driver, 6: display region, 7: opening, 10: vehicle information acquiring unit, 20: controller, 22: audio output unit, 23: nonvolatile memory, 24: memory, 25: light source adjustment unit, 26: distortion correction unit, 27: display element driver, 29: mirror adjustment unit, 30: video display apparatus, 50: mirror driver, 51: mirror, 52: mirror, 60: speaker, 80: self-failure determination unit, 81: unit-failure determination unit, 82: failure-time display determination unit, 101: vehicle speed sensor, 102: shift position sensor, 103: steering angle sensor, 104: headlight sensor, 105: illuminance sensor, 106: chromaticity sensor, 107: distance measuring sensor, 108: infrared sensor, 109: engine start sensor, 110: acceleration sensor, 111: gyro sensor, 112: temperature sensor, 113: road-to-vehicle communication wireless receiver, 114: vehicle-to-vehicle communication wireless receiver, 116: camera, 117: GPS receiver, 118: VICS receiver, 120: functional film

The invention claimed is:

1. A head up display apparatus configured to display a video in a display region visually recognized through a windshield from a driver's seat of a vehicle, the head up display apparatus comprising:
a vehicle information acquiring unit configured to acquire vehicle information detected by the vehicle;
a controller configured to control the display of the video;
a video display apparatus configured to generate the video; and
a storage unit configured to store information,
wherein the controller acquires apparatus information which is information used when determining apparatus fault, determines whether the apparatus fault is present or not based on the acquired apparatus information, and generates a flag indicating that a display content is changed due to the apparatus fault and stores the flag in the storage unit when determined that the apparatus fault is present.

2. The head up display apparatus according to claim 1, wherein the controller cuts off the power supplied to the head up display apparatus as a display content changing process to change the display content of the video when confirmed that the flag is stored in the storage unit.

3. The head up display apparatus according to claim 1, wherein the controller determines whether the apparatus fault is present or not by regularly acquiring the apparatus information while performing a display content changing process, and stops the display content changing process being performed when determined that the apparatus fault is not present.

4. A head up display apparatus configured to display a video in a display region visually recognized through a windshield from a driver's seat of a vehicle, the head up display apparatus comprising:
a vehicle information acquiring unit configured to acquire vehicle information detected by the vehicle;
a controller configured to control the display of the video;
a video display apparatus configured to generate the video;
a functional film configured to control passage of the video projected onto the windshield by the video display apparatus in accordance with a level of applied voltage,
wherein the controller determines a fault of a unit connected externally and performs a display content changing process to change display content of the video when determined that the fault is present in the unit,
the unit outputs the vehicle information acquired by the vehicle information acquiring unit, and
wherein the controller controls the voltage applied to the functional film so that the video does not pass through the film as the display content changing process.

5. A head up display apparatus configured to display a video in a display region visually recognized through a windshield from a driver's seat of a vehicle, the head up display apparatus comprising:
a vehicle information acquiring unit configured to acquire vehicle information detected by the vehicle;
a controller configured to control the display of the video;
a video display apparatus configured to generate the video; and
a functional film configured to control passage of the video projected onto the windshield by the video display apparatus in accordance with a level of applied voltage,
wherein the controller acquires apparatus information which is information used when determining apparatus fault, determines whether the apparatus fault is present or not based on the acquired apparatus information, and performs a display content changing process to change display content of the video when determined that the apparatus fault is present, and
wherein the controller controls the voltage applied to the functional film so that the video does not pass through the film as the display content changing process.

6. The head up display apparatus according to claim 5, wherein the controller determines whether the apparatus fault is present or not by regularly acquiring the apparatus information while performing the display content changing process, and stops the display content changing process being performed when determined that the apparatus fault is not present.

7. The head up display apparatus according to claim 4, wherein the controller determines whether the apparatus fault is present or not by regularly acquiring the apparatus information while performing the display content changing process, and stops the display content changing process being performed when determined that the apparatus fault is not present.

* * * * *